Figures 1, 2:
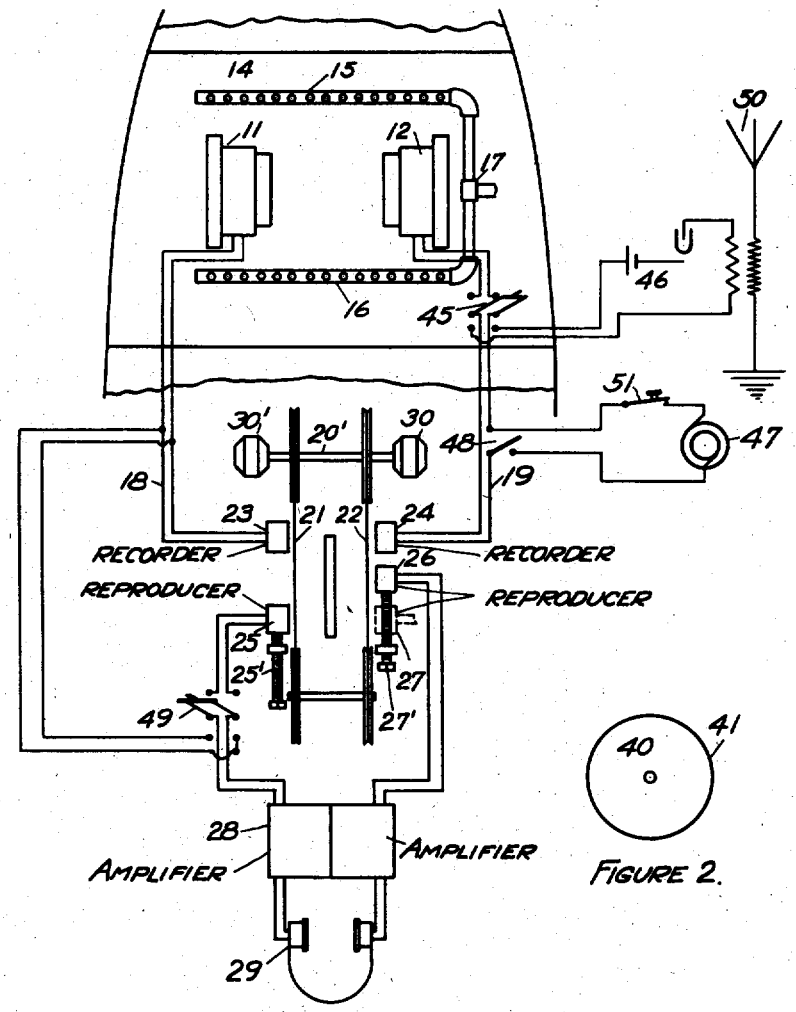

June 29, 1926. Re. 16,372

R. A. FESSENDEN

ACOUSTIC METHOD AND APPARATUS

Original Filed April 28, 1919

INVENTOR.
Reginald A. Fessenden
BY
Brad Hayes
ATTORNEYS.

Reissued June 29, 1926. Re. 16,372

UNITED STATES PATENT OFFICE.

REGINALD A. FESSENDEN, OF CHESTNUT HILL, MASSACHUSETTS, ASSIGNOR TO SUBMARINE SIGNAL COMPANY, OF PORTLAND, MAINE, A CORPORATION OF MAINE.

ACOUSTIC METHOD AND APPARATUS.

Original No. 1,453,316, dated May 1, 1923, Serial No. 293,297, filed April 28, 1919. Application for reissue filed April 9, 1925. Serial No. 21,992.

My invention relates to acoustic methods and apparatus, and more particularly to locating the direction of sound sources, and still more particularly to submarine signalling.

My invention has for its object increased efficiency of acoustic methods and apparatus, and more particularly increased efficiency in locating the direction of sound sources, and still more particularly increasing the efficiency of submarine signalling, and locating the direction and position of sources of submarine sounds.

The accompanying drawing forming a part of the specification shows in Figures 1 and 2, partly diagrammatically, means suitable for carrying out my invention.

Heretofore the direction and position of sources of sound have been determined in a number of ways, for example, (*a*) Mounting two receivers on opposite sides of a body, such as a ship, and turning the body until the sound is heard equally well in both receivers.

(*b*) Using two receivers, and turning them so that the phases of the sounds received in each receiver are coincident or opposite to each other (U. S. Patent 1,270,398, October 7, 1915).

(*c*) By reflection (U. S. Patent 1,240,328, Jan. 15, 1917).

(*d*) By using two receivers and cutting down the strength of the sounds received in one to equality to those heard in the other.

(*e*) By varying the phase of the currents produced in two receivers by varying the inductance or capacity of the receiver circuits (U. S. application).

(*f*) By receiving the sounds on a number of receivers separated by sound screens, and noting on which receiver the sound is the loudest.

(*g*) By varying the relative length of two air columns operatively connected so as to transmit to the ear, either directly or indirectly, the sounds whose direction it is desired to determine.

(*h*) By other methods forming the subject of other applications.

The above methods have all been useful, but the method described in the present specification has certain advantages, more particularly as regards accuracy, simplicity, reliability, and adaptability.

In the present method the sounds whose direction it is desired to determine are not received directly, but are recorded and then reproduced, and advantage is taken of the fact that by so doing it becomes possible to vary the time of reproduction of a sound heard in one receiver relatively to the time of reproduction of the sound heard in a second receiver.

Consequently if two receivers are located at a distance from each other, for example, on opposite sides of a ship, or preferably in an oil tank or ballast tank in a ship, it is possible by varying the times of reproduction of the sounds recorded from each of the two receivers, to make the reproduction occur at any desired phase or time relation, for example, though the sound from the source whose direction it is desired to determine may reach the two receivers at different instants of time, their reproduction may be made to occur simultaneously and in the same phase, and from the extent to which the relative times of reproduction are varied, the direction of the source of sound may be determined with great accuracy.

The following is a description of the apparatus and method.

Figure 1 is a diagrammatic view of apparatus adapted to carry out my invention; Figure 2 being an elevation of an alternative member described below.

In Figure 1, 14 represents an oil tank in a destroyer. 11 and 12 are receivers of any suitable type, for example, oscillators. The oscillator armatures are connected by the leads 18 and 19, to the recorders, 23, 24, of a telegraphophone. 21, 22, are the magnetic wires of the telegraphophone, driven as shown by two wheels mounted on the shafts 20, 20′ and driven by the motors 30, 30′ at a predetermined constant speed or otherwise as referred to below. 25, 26 are reproducers connected as shown to an amplifier 28, and the amplified signals are led from the amplifier as shown to the two ear phones of the head telephone 29.

Both reproducers are capable of adjustment toward and from the recorders, 26 and 27 showing two positions of one of the reproducers as described below, the changes in position being accomplished by set screws 25′, 27′, respectively, arranged to operate in a well known manner.

15 and 16 are perforated tubes connected through the cock 17, to a source of compressed air, and these tubes are immersed so as to be just below the level of the oscillators 11 and 12.

In the practical operation of the apparatus, a sound coming from dead ahead and striking the oscillators 11 and 12 will affect them at the same instant, and the sounds will be recorded simultaneously by the recorders 23, 24, and since the wires 21, 22, are travelling at the same speed, they will be reproduced simultaneously by the reproducer 25, and a reproducer located in the position 27, and will consequently be heard simultaneously and in the same phase by the operator listening in to the head phone 29.

If, however, the sound comes from the direction of the upper left hand corner of the figure, it will be received by the oscillator 11 before it is received by the oscillator 12, and will be recorded by the recorder 23 before it is recorded by the recorder 24.

Consequently, in order that the reproductions of the sounds may be heard simultaneously, the reproducer of the sound received by the oscillator 12 must be shifted towards the recorder 24 into the position shown at 26, and the amount of the shifting may be used to determine the exact direction of the sound.

This is most conveniently done by producing sounds at different known angles with the fore and aft line of the ship, maintaining the reproducer 25 in a fixed position, shifting the reproducer 26 until the sound is reproduced in both reproducers simultaneously, and marking off the known angle on a scale 31: and repeating the process until all the desired angles are on the scale.

Where only two oscillators are used, there will sometimes be difficulty in determining whether the source of sound is a certain number of degrees ahead of the ship's beam, or an equal number of degrees astern of the ship's beam. To determine this the operator turns the cock so as to emit air bubbles from the perforated pipe 15, thereby forming a sound screen dead ahead of the oscillators 11 and 12. If the sounds are weakened by doing this, he knows that the source of sound is ahead.

Similarly by turning the cock 17 in the other direction, so that the air bubbles do not come off from the perforated pipe 15, but do come off from the perforated pipe 16, he will find that the sound is not weakened and consequently he is doubly able to assure himself of the fact that the sound is coming from a point ahead.

In place of using magnetic wires, running over pulleys, as shown in Figure 1, for recording the sounds, a disc, as shown at 40, Figure 2, may be used, either the whole disc being made out of magnetic material, or having a magnetic rim 41. This has the advantage of simplicity of construction and gives increased efficiency and accuracy.

It is preferred that the magnetic recording material, whether wire or disc, be run at a predetermined speed, and it is also preferable that this speed should bear a definite relation to the distance apart of the two oscillators 11 and 12. By changing the relative speeds of the motors 30, 30′ the relative speeds of the wires 21 and 22 will be changed.

I have found by experiment that if the oscillators are five feet apart, the magnetic recording material should preferably travel at a speed of approximately three thousand feet per minute, if the best results are to be obtained, though good results may be obtained with speeds considerably less or greater than three thousand feet per minute.

The telegraphophone is not shown in full, as it is a well-known article of commerce, and hence the wiping out magnet, starting switches, etc., are not shown.

50 is a wireless antenna operatively connected to a wireless receiving circuit 46. 47 is an alternating current dynamo, and 51 is a telegraph key.

45, 48 and 49 are switches which are normally closed and in the upward position, so as to connect the oscillator 12 with the recorder 24, and the reproducer 25 with the amplifier 28.

It is obvious that in place of varying the reproducers relatively to each other, they may be maintained fixed, and the speed of the two wires 21, 22, varied relatively to each other.

The apparatus for the method above described can be constructed so as to be very compact, can be made very reliable, and to give direction with very great accuracy, and by adjusting the speed of the recording material, and in other ways, as by moving the recorders or reproducers as well as the magnetic material, can be made selective to sounds of any desired frequency, but this is not shown, as it is described and claimed in another application.

The apparatus is also little affected by disturbing noises.

The method and apparatus may be used for other acoustic purposes such as determining the distance of the source, or of echo producing bodies, such as the bottom of the sea, or icebergs.

For example, if the switch 45, which is normally thrown upwards, be thrown downwards, the wireless receiving circuit 46, operatively connected to the antenna 50, will be connected to the recorder 24 and the oscillator 12 will be cut out.

If a lightship be equipped with a wireless sending station and a submarine signal sending station, a wireless signal and a submarine signal may be emitted simultaneously at intervals of say 1 or 2 minutes, by means and methods described in another application.

The wireless signal sent out from the lightship will be received on the antenna 50, and recorded by the recorder 24, and the submarine signal sent out at the same instant from the lightship may be received by the oscillator 11, and recorded by the recorder 23.

As the wireless signal will be received practically instantaneously, whereas the submarine signal will travel at the rate of about forty-four hundred feet per second, the wireless signal will be recorded by the recorder 24 before the submarine signal is recorded by the recorder 23, and hence the reproducer 26 will have to be shifted away from the recorder 24, or else the reproducer 25 shifted towards the recorder 23, in order that both signals may be heard simultaneously in the ear pieces of the receiver 29, and the amount of relative shifting of the reproducers 26 and 25 will depend upon the distance of the lightship from the vessel carrying the receiving apparatus, and this distance can be read off on the scale 31, the scale 31 being calibrated experimentally so as to read distance directly, preferably in tenths of miles.

Similarly the apparatus may be used for taking soundings by echo, or determining the distance of icebergs by echo, by throwing the switch 48, which is normally thrown upwards, to the right, so as to put the alternator 47 in series with the recorder 24 and the oscillator 12, the switch 45 being also in its normal or upward position.

On closing the key 51, for a short time, say a second, a submarine signal will be sent out by the oscillator 12 and at the same instant recorded by the recorder 24.

The sound so produced will travel outwards, and on striking any reflecting object, such as the bottom of the sea, or an iceberg, will be returned, and after a time, depending upon the distance of the reflecting object and the velocity of sound in the water, will reach the oscillator 11, acting as a receiver, and will be recorded by the recorder 23.

The reproducers 25 and 26 may then be shifted relatively to each other, for example, the reproducer 26 shifted away from 24, and the reproducer 25 shifted towards 23 until the sound of the signal sent out from 12 and the echo received back will be heard at the same instant of time, and the amount of shifting will as before be a measure of the distance of the reflecting object, and the scale 31 may be graduated so as to read the depth of the sea or the distance of the iceberg directly in feet or yards or fathoms.

This method of taking soundings has the advantage that soundings may be taken while the vessel is at full speed. It is also much more accurate than any other known method, as applicant has found by experiment that the instant of coincidence of two sounds may be determined with an accuracy of one five thousandth of a second, which corresponds to an accuracy of six inches in taking the sounding.

While for most purposes applicant prefers to use two recorders and two reproducers, one recorder and one reproducer may be used.

For example, if the switch 49, which is normally in the upward position, be thrown downward, while the switches 48 and 45 are maintained in their normal position, i. e., upwards, and the apparatus is used for determining direction as described in the first part of the specification, the sound received by the oscillator 11 will be transmitted directly through the amplifier 28, to the head phone 29, instead of reaching the head phone 29 from the reproducer 25.

But a sound coming from the direction of the upper right hand part of the figure will reach the oscillator 12 before it reaches the oscillator 11, and be recorded by the recorder 24, and hence the reproducer 26 can be shifted to such a position that the sound received by the oscillator 12 and the sound received by the oscillator 11 can be heard simultaneously in the head phone 29, and the amount of shifting will as before determine the direction.

Having now described my invention, I claim:

1. The method of determining the interval of time elapsing between the receipt of sounds at two points at a distance from each other which consists in receiving the sound at each of said points, recording the sound received at one of said points, reproducing the recorded sound at a time later than the time of making the record and comparing the reproduced sound from said point with the sound received at the other point.

2. In a method of determining the interval of time elapsing between the receipt of sounds at two points at a distance from each other which consists in receiving the sound at each of said points, recording the sound received at one of said points, reproducing the recorded sound at a time later than the time of making the record and varying the time interval between the making of the record and the reproduction of the sound.

3. The method of determining the interval of time elapsing between the receipt of sounds at two points at a distance from each other which consists in receiving the sound at each of said points, recording the sound received at one of said points, reproducing the recorded sound at a time later than the time of making the record and determining the time interval between the making of the record and the reproduction of the sound.

4. In a method of determining the interval of time elapsing between the receipt of sounds at two points at a distance from each other which consists in receiving the sound at each of said points, recording the sound received at one of said points, reproducing the recorded sound at a time later than the time of making the record, and adjusting the time interval between the making of the record and the reproduction of the sound until the sound heard from each of the two points produces an indication at the same instant of time.

5. The method of determining the direction of sounds, which consists in receiving the sounds by means of two receivers located at a distance from each other, recording the sounds received by the receivers, reproducing the recorded sounds, varying the time of reproduction of the recorded sounds relatively to one another, and determining the direction of the source of sound from the amount of said variation.

6. In an acoustic apparatus comprising two sound receivers, two sound recorders, one connected to each sound receiver; two sounds records, two sound reproducers, and means for varying the times of reproduction of the records relatively to each other.

7. Acoustic apparatus comprising two sound receivers, two sound recorders, one connected to each sound receiver; two sound records, two sound reproducers, and means for varying the times of reproduction of the records relatively to each other, and a scale for indicating the amount of relative variation.

8. A method of locating the direction of a source of vibration which consists in measuring the time interval between the response thereto of two similar vibration-responsive current-varying devices by relatively varying the time interval between the recording and reproducing of effects by such devices to bring the electrical variations caused by the reproductions into phase coincidence, whereby the direction of the source of vibration may be deduced from the relation of the time intervals between the recording and reproducing.

9. A method of measuring small time intervals which consists in successively generating in a plurality of electrical circuits similar waves spaced by the time intervals to be measured, simultaneously recording the effects produced by such waves and adjusting the time of reproduction from such records until the reproduced waves are in phase coincidence whereby the time adjustment serves as a measure of the time interval.

10. A method of measuring the depth of a body of water which comprises the establishment of a signal producer and a receiver at a distance from each other, causing sounds from the producer to be directed to the bottom of the water and reflected therefrom and to be received by said receiver and transmitted to an indicator and causing said signal from said producer to be sent to said indicator, and synchronizing the arrival of the signals at the indicator, and measuring the depth by the adjustment necessary for causing synchronism.

11. The method of determining distance consisting in sending out a sound impulse, imparting this impulse directly to a primary receiving system leading to one ear of an observer, taking up the reflected impulse in a secondary receiving system leading to the other ear of the observer, and retarding the impulse in the primary receiving system so as to cause it to coincide with the reflected impulse as to time of arrival at the ears of the observer and measuring the distance by the amount of retardation.

12. In a device for measuring distance with the aid of a sound producer, a sound receiver, two indicators, means for conducting a direct impulse of the sound producer to one of said indicators, means for conducting the reflected impulse received by said sound receiver to the other of said indicators, adjusting means to synchronize the impulse at the indicators, and means to indicate the magnitude of the distance to be measured.

13. A method for measuring distances by means of reflected sound impulses, comprising sending out an electrically produced sound impulse, imparting a corresponding impulse to a traveling recording member, reproducing the recorded impulse in one receiving member, reproducing the reflected impulse in another receiving system, adjusting the time of travel of the recorded impulse so as to cause its reproduction to coincide with the reflected impulse in the second receiving system, and measuring the distance by means of the necessary adjustment.

14. In a method of measuring distances by means of reflected sound impulses, comprising sending out a sound impulse, imparting a corresponding direct impulse to one receiving member, receiving the reflected impulse in another receiving system, retarding the direct impulse so as to cause its reproduction to coincide with the reflected impulse in the second named receiving system and measuring the distance by means of necessary retardation.

REGINALD A. FESSENDEN.